(12) United States Patent
Dubus et al.

(10) Patent No.: US 9,755,522 B2
(45) Date of Patent: Sep. 5, 2017

(54) METHOD AND DEVICE FOR CONTROLLING A MULTIPHASE RESONANT DC/DC CONVERTER, AND CORRESPONDING MULTIPHASE CONVERTER

(71) Applicant: VALEO EQUIPEMENTS ELECTRIQUES MOTEUR, Créteil (FR)

(72) Inventors: Patrick Dubus, Saint Forget (FR); Gang Yang, Courbevoie (FR)

(73) Assignee: Valeo Equipements Electriques Moteur (FR)

( * ) Notice: Subject to any disclaimer, the term of this patent is extended or adjusted under 35 U.S.C. 154(b) by 0 days.

(21) Appl. No.: 14/785,688

(22) PCT Filed: Apr. 1, 2014

(86) PCT No.: PCT/FR2014/050771
§ 371 (c)(1),
(2) Date: Oct. 20, 2015

(87) PCT Pub. No.: WO2014/174171
PCT Pub. Date: Oct. 30, 2014

(65) Prior Publication Data
US 2016/0072388 A1    Mar. 10, 2016

(30) Foreign Application Priority Data

Apr. 23, 2013  (FR) ...................................... 13 53668

(51) Int. Cl.
*H02M 3/158*    (2006.01)
*H02M 3/335*    (2006.01)
(Continued)

(52) U.S. Cl.
CPC ......... *H02M 3/285* (2013.01); *H02M 3/1584* (2013.01); *H02M 3/338* (2013.01);
(Continued)

(58) Field of Classification Search
CPC ........ H02J 1/102; H02J 2001/106; H02J 1/10; H02M 3/1584; H02M 3/285;
(Continued)

(56) References Cited

U.S. PATENT DOCUMENTS 4,644,458 A * 2/1987 Harafuji ................... H04B 3/44
                                            363/65
5,563,780 A * 10/1996 Goad ...................... H02J 1/102
                                            307/82

(Continued)

FOREIGN PATENT DOCUMENTS

EP          2299580         3/2011

OTHER PUBLICATIONS

Bong-Chul Kim et al: "Load sharing characteristic of two-phase interleaved LLC resonant converter with parallel and series input structure", Energy Conversion Congress and Exposition, 2009. ECCE. IEEE, IEEE, Piscataway, NJ, USA, Sep. 20, 2009 (Sep. 20, 2009), pp. 750-753, XP031887532, DOI: 10.1109/ECCE.2009. 5316053 ISBN: 978-1-4244-2893-9.

(Continued)

*Primary Examiner* — Gary L Laxton
(74) *Attorney, Agent, or Firm* — Berenato & White, LLC

(57) ABSTRACT

A method for controlling a multiphase resonant DC/DC converter comprising a plurality of identical elementary resonant DC/DC converters connected in parallel. The method comprises the steps of measuring each of the supply currents ($I_{R1}$, $I_{R2}$, ... $I_{Rn}$) of the elementary converters for balancing the supply currents ($I_{R1}$, $I_{R2}$, ... $I_{Rn}$) and controlling switching frequencies ($F_1$, $F_2$, ... $F_n$) of the (Continued)

elementary converters according to the supply currents ($I_{R1}$, $I_{R2}, \ldots I_{Rn}$), so as to carry out the balancing. The supply currents ($I_{R1}, I_{R2}, \ldots I_{Rn}$) are measured in the elementary DC/DC converters in order to balance these same currents.

7 Claims, 4 Drawing Sheets

(51) Int. Cl.
  *H02M 3/28* (2006.01)
  *H02M 3/338* (2006.01)
  *H02M 3/337* (2006.01)

(52) U.S. Cl.
  CPC ..... *H02M 3/3376* (2013.01); *H02M 3/33569* (2013.01); *Y02B 70/1425* (2013.01); *Y02B 70/1433* (2013.01)

(58) Field of Classification Search
  CPC . H02M 2007/4815; H02M 2007/4822; H02M 3/158; H02M 3/335; Y02B 70/1416; Y02B 70/1433; Y02B 70/1441
  See application file for complete search history.

(56) References Cited

U.S. PATENT DOCUMENTS

| | | | |
|---|---|---|---|
| 6,009,000 A * | 12/1999 | Siri | H02J 1/102 363/21.09 |
| 7,933,132 B2 * | 4/2011 | Bridge | H02M 3/1584 363/65 |
| 8,351,230 B2 * | 1/2013 | Nishihara | H02M 1/08 363/21.02 |
| 8,456,875 B2 * | 6/2013 | Li | H02M 3/285 363/65 |
| 2010/0328968 A1 | 12/2010 | Adragna et al. | |
| 2011/0080146 A1 | 4/2011 | Li et al. | |
| 2012/0236610 A1 | 9/2012 | Lee et al. | |

OTHER PUBLICATIONS

Bong-Chul Kim et al: "Analysis and design of two-phase interleaved LLC resonant converter considering load sharing", Energy Conversion Congress and Exposition, 2009. ECCE. IEEE, IEEE, Piscataway, NJ, USA, Sep. 20, 2009 (Sep. 20, 2009), pp. 1141-1144, XP031887770, DOI: 10.1109/ECCE.2009.5316291 ISBN: 978-1-4244-2893-9.

Figge H et al: "Paralleling of LLC resonant converters using frequency controlled current balancing", Power Electronics Specialists Conference, 2008. PESC 2008. IEEE, IEEE, Piscataway, NJ, USA, Jun. 15, 2008 (Jun. 15, 2008), pp. 1080-1085, XP031300116, ISBN: 978-1-4244-1667-7.

Orietti E et al: "Analysis of multi-phase LLC resonant converters", Power Electronics Conference, 2009. COBEP '09. Brazilian, IEEE, Piscataway, NJ, USA, Sep. 27, 2009 (Sep. 27, 2009), pp. 464-471, XP031576085, ISBN: 978-1-4244-3369-8.

Zhiyuan Hu et al: "An interleaved LLC resonant converter operating at constant switching frequency", Energy Conversion Congress and Exposition (ECCE), 2012 IEEE, IEEE, Sep. 15, 2012 (Sep. 15, 2012), pp. 3541-3548, XP032467142, DOI: 10.1109/ECCE.2012.6342315 ISBN: 978-1-4673-0802-1.

\* cited by examiner

METHOD AND DEVICE FOR CONTROLLING A MULTIPHASE RESONANT DC/DC CONVERTER, AND CORRESPONDING MULTIPHASE CONVERTER

CROSS-REFERENCE TO RELATED APPLICATIONS AND CLAIM TO PRIORITY

This application is a national stage application of International Application No. PCT/FR2014/050771 filed Apr. 1, 2014, which claims priority to French Patent Application No. 1353668 filed Apr. 23, 2013, the disclosures of which are incorporated herein by reference and to which priority is claimed.

FIELD OF THE INVENTION

The present invention relates to a method and a device for controlling a multiphase resonant DC/DC converter which is designed to supply from a direct current source power equipment with a plurality of storage units of a motor vehicle.

The invention also relates to the corresponding multiphase converter, as well as to an AC/DC converter comprising a multiphase DC/DC converter provided with a control device of this type.

BACKGROUND OF THE INVENTION

Resonant DC/DC converters which make it possible to transform one voltage level into another are frequently implemented in high power-density and high-performance DC/DC conversion systems.

A simplified basic architecture of a resonant direct current—direct current converter (or DC/DC according to the corresponding acronym) of the "LLC series" type (i.e. comprising two inductive resistors 1, 2 and a capacitor 3 in series) is represented in FIG. 1.

At the input, two field effect power transistors 4, 5 of the MOSFET type are connected to a direct current source 6, forming a half-bridge with a first, so-called high-side transistor 4 connected to the potential terminal of the source 6, and a second, so-called low-side transistor 5 connected to the earth.

The resonant circuit 7 comprises in series the capacitor 3 and a first inductive resistor 1 which determines the resonance, and a second inductive resistor 2 of a transformer 8. At the output there are two rectifier diodes 9 and a filtering capacitor 10 which supplies a load resistor 11 with direct current.

The two power MOSFETs 4, 5 are switched in a complementary manner according to a duty cycle close to 50%, leaving a constant dead time in order to avoid a phenomenon of simultaneous conduction.

This known LLC converter functions according to a zero voltage switching mode of all the semiconductors 4, 5 in a wide range of charges, with improved EMC (electromagnetic compatibility) performance and a limited switching frequency.

However, because of the substantial pulse currents on the secondary of the transformer 8 and high currents on the primary, the use of an elementary converter of this type is limited to low or medium power levels. In fact, applications which require high powers and strong currents lead to iron losses and additional switching losses which reduce the global performance of the converters.

In order to produce high-power converters and eliminate these disadvantages, use is made of a multiphase architecture in which a plurality of identical elementary converters are connected at the input in parallel on a single source 6, and at the output in parallel on a single load 11 (parallel-parallel LLC multiphase converter), as shown clearly in FIG. 1, in order to share the total power amongst all the elementary converters and to distribute the currents better between the different power units in order to obtain good performance.

The current which circulates in the primary of the transformer 8 can be reduced, and the current constraints imposed on the MOSFET transistors 4, 5 are reduced and distributed between the different power units.

A well-known control method for the transistors 4, 5 of the half-bridges of the elementary converters of the multiphase converter consists of making the n phases function (n being equal to or more than 2) at a common switching frequency, with a phase shift $\Delta\phi$ of T/n (period number of units) between two adjacent elementary converters, in order to obtain an output current with fewer pulse transients.

However, this well-known control method is valid only in the hypothesis that all the elementary converters have exactly the same electrical characteristics, i.e. same first induction coil $L_{R1}$, $L_{R2}$, $L_{R3}$ at the resonance of the first inductive resistor 1, same capacity $C_{R1}$, $C_{R2}$, $C_{R3}$ at the resonance of the capacitor 3, same second induction coil $L_{M1}$, $L_{M2}$, $L_{M3}$ of the second inductive resistor 2, and same switching parameters $Q_{H1}$, $Q_{H2}$, $Q_{H3}$; $Q_{L1}$, $Q_{L2}$, $Q_{L3}$ of the transistors 4, 5.

This means that a type of super-symmetry must be maintained between all the elementary converters.

In the event of malfunctioning, the slightest dissymmetry is liable to create enormous balancing problems, with the largest fraction of the current passing via a single power unit and leaving the other units functioning at a low output power, or even zero power.

For example, a difference of 5% between the first induction coil $L_{R1}$ of the first inductive resistor 1 and another can introduce a current imbalance which can reach 90%.

Since each parameter of the electronic component has a certain tolerance (typically in the motor vehicle industry ±5% for a capacitor and ±10% for an inductive resistor), this well-known control method is in fact totally inefficient for ensuring the balancing of the currents between the different elementary converters, and therefore for maintaining acceptable global performance.

European patent application EP2299580 proposes a method and a device for controlling a multiphase resonant DC/DC converter in order to solve the problem of imbalance of the currents in elementary converters of the LLC type, without costly selection and matching of the components.

As represented schematically in FIG. 1, the method consists in particular of measuring the supply currents of the elementary converters (three being represented) by means of shunts 12, and of controlling the phase shifts $\Delta\phi_{1-2}$, $\Delta\phi_{2-3}$ between the control signals, with the same common frequency, of the MOSFET transistors 4, 5 of the half-bridges, such as to balance these supply currents.

However, this method is close to the conventional method, and computer simulations carried out by the inventive body have shown that this method was not optimum. Ways therefore remain for improvement of a control method of the same type, making it possible to eliminate the above-described disadvantages.

SUMMARY OF THE INVENTION

For the purpose of applications in the highly competitive motor vehicle industry, the objective of the present invention is consequently to make progress in this respect.

Specifically, the subject of the invention is a method for controlling a multiphase resonant DC/DC converter comprising a plurality of identical elementary resonant DC/DC converters connected in parallel.

This method is of the type consisting of measuring each of the supply currents of the elementary converters in order to balance the supply currents.

The method according to the invention is distinguished in that it also consists of controlling switching frequencies of the elementary converters according to the supply currents, so as to carry out this balancing.

Highly advantageously this method for controlling a multiphase resonant DC/DC converter also consists of setting the supply currents to a common reference intensity which is determined according to a difference between an output voltage of the multiphase converter and a nominal voltage.

In the method according to the invention, the supply currents are preferably determined by measuring differences of potential at the terminals of shunts inserted in series in supply circuits of the elementary converters.

The switching frequencies are advantageously derived from a voltage—frequency conversion.

The invention also relates to a device for controlling a multiphase resonant DC/DC converter comprising a plurality of identical elementary resonant DC/DC converters connected in parallel.

This control device is of the type comprising intensity measurement means for each of the supply currents of the elementary converters, in order to balance supply currents, and which can implement the above-described method.

The control device according to the invention is distinguished in that it additionally comprises frequency generators which generate switching frequencies for the elementary converters according to these supply currents.

In addition, this control device advantageously comprises:
- a comparator between an output voltage of the multiphase converter and a nominal voltage;
- a regulation loop which sets the supply currents to a common reference intensity.

Preferably, the intensity measurement means comprise:
- shunts inserted in series in supply circuits of the elementary converters;
- voltage measurement means which determine differences of potential at the terminals of these shunts.

The invention also relates to a multiphase resonant DC/DC converter comprising a plurality of identical elementary resonant DC/DC converters connected in parallel, and comprising the above-described control device.

The elementary converters are advantageously of the LLC type, each comprising two inductive resistors and a capacitor.

Preferably, switching means of each of the elementary converters are constituted by switching elements connected in the form of a half-bridge.

Benefit is derived from the fact that in the multiphase resonant DC/DC converter according to the invention, a plurality of specimens of the electronic components of the elementary converters are not matched.

The invention also relates to a multiphase resonant AC/DC converter, distinguished in that it is advantageously constituted by an AC/DC converter at the input coupled to a multiphase resonant DC/DC converter with the above specifications at the output.

These few essential specifications will have made apparent to persons skilled in the art the advantages provided by the method for controlling a multiphase resonant DC/DC converter according to the invention, as well as by the corresponding control device and multiphase converter, in comparison with the prior art.

The detailed specifications of the invention are provided in the following description in association with the appended drawings.

It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1:
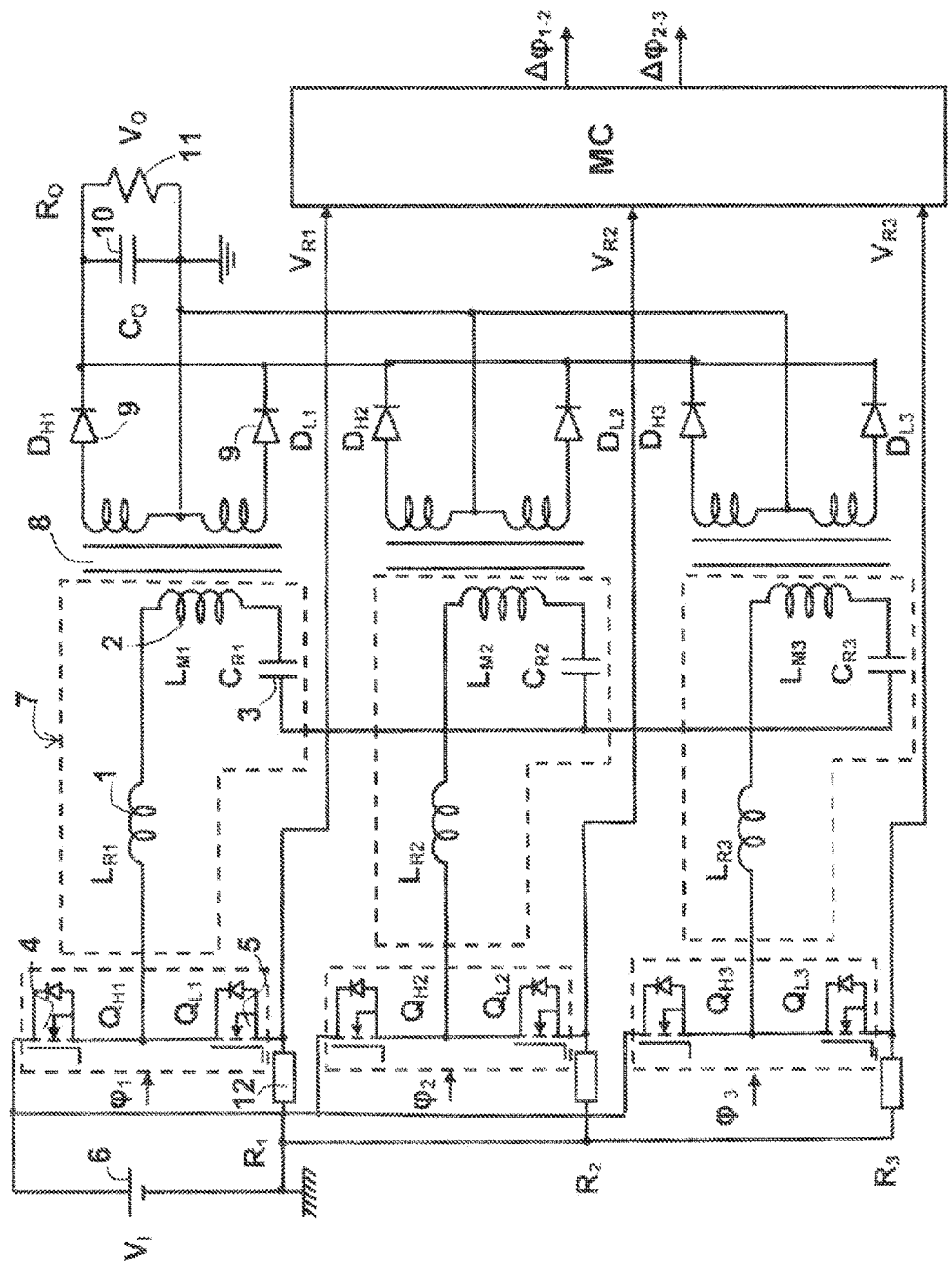
FIG. 1 represents schematically a multiphase resonant DC/DC converter and its control device known in the prior art.
Figure 2:
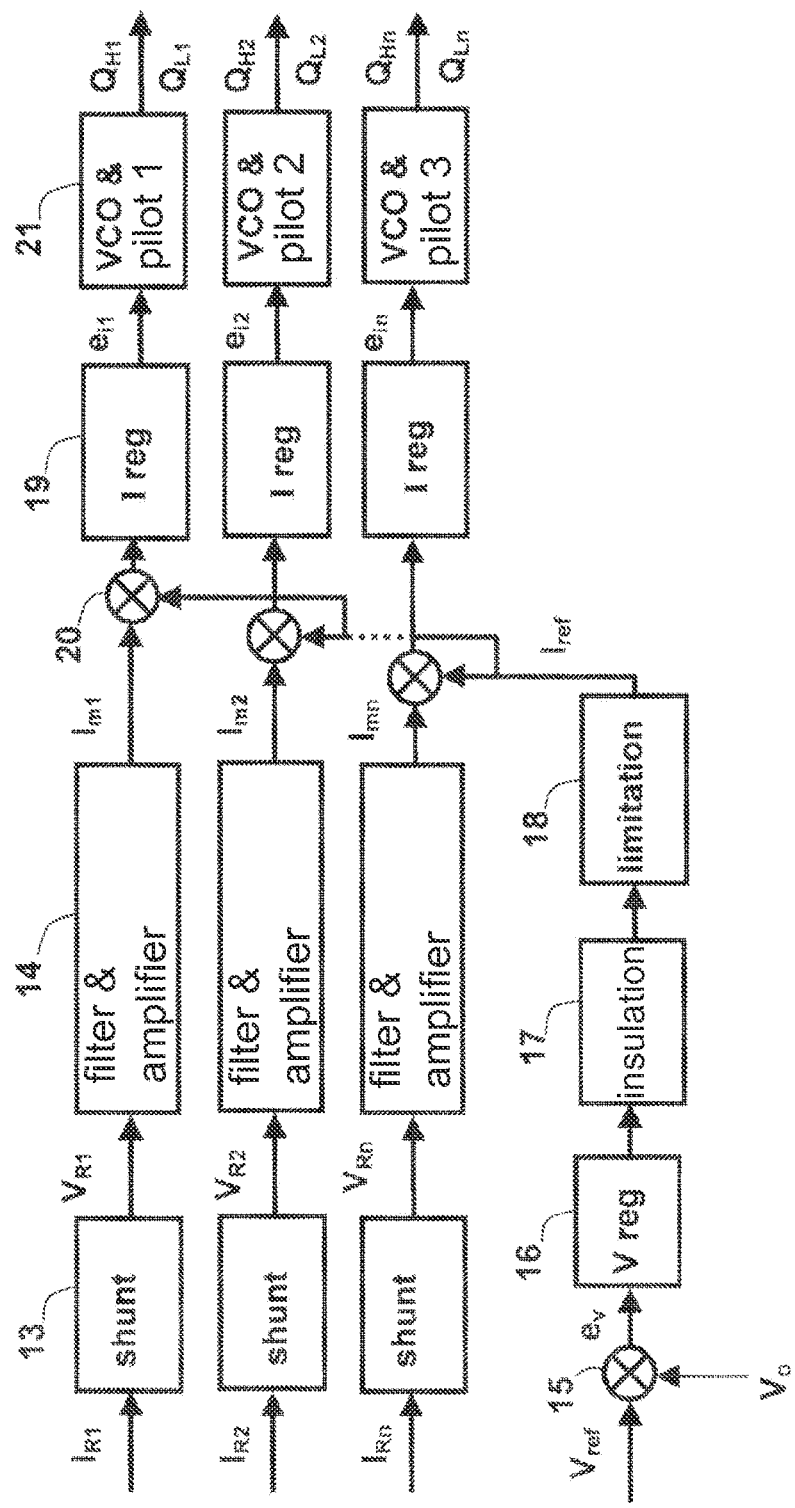
FIG. 2 is a schematic diagram of a device for controlling a multiphase resonant DC/DC converter according to the invention.

As indicated in FIG. 2 the supply currents $I_R'$, $I_{R2}$, ... $I_{Rn}$ of the elementary converters of the multiphase resonant DC/DC converter (with n phases) according to the invention are detected by their respective shunts 12, and converted 13 into differences of potential $V_{R1}$, $V_{R2}$, ... $V_{Rn}$.

These signals $V_{R1}$, $V_{R2}$, ... $V_{Rn}$ are filtered by low-pass filters 14 with high gain in the switching frequency band $F_1$, $F_2$, ... $F_n$ of the elementary converters, in order to eliminate the noise provided by the switching elements 4, 5.

These filters 14 normally comprise a common mode low-pass filter for filtering of the common mode noise, and a differential mode low-pass filter for filtering of the differential mode noise. The order of the filters 14, determining the gradient of the frequency response, matters little.

The signals filtered are amplified 14 to levels $I_{m1}$, $I_{m2}$, ... $I_{mn}$ which are suitable for the current regulation loops of the elementary converters.

In the voltage regulation loop which is implemented in the present invention, the output voltage $V_o$ of the multiphase converter is compared 15 with a nominal voltage $V_{ref}$ and results in an error signal $e_v$.

A voltage divider bridge is advantageously added for the measurement of the output voltage $V_o$ according to the level of the output voltage $V_o$ of the multiphase converter.

The nominal voltage $V_{ref}$ is provided either by a constant or variable external voltage reference, or by an internal source, such as, for example, a circuit of the TL431 type.

Regulation 16 implemented by the method according to the invention is of any type, such as PI, PID, etc.

Electrical insulation 17 is always necessary, generally obtained by means of photodiodes. The electrical insulation stage 17 can be placed in any location of the voltage regulation loop, before the regulation 16 or after a limiter stage 18.

The limiter stage 18 is designed to eliminate the deviating values of an intensity $I_{ref}$ in order to avoid the risk of overloading and to improve the robustness of the multiphase converter.

Control of the current level of each elementary converter is also advantageous, or even obligatory, when the multiphase converter is situated between two voltage sources of an electric vehicle or a hybrid vehicle (high-voltage battery and low-voltage battery).

A pass band of this voltage regulation loop is advantageously approximately a few KHz.

In the preferred embodiments of the invention, the reference intensity $I_{ref}$ is common to all the current regulation loops which regulate the supply currents $I_{R1}, I_{R2}, \ldots I_{Rn}$.

The advantage of these current regulation loops is that two elementary converters can share a single input current supplied by the same source 6, even if the electrical parameters of the elementary converters differ, although their wiring diagrams are identical because of the dispersion of the characteristics of the components 1, 2, 3, 4, 5, 8.

Since the supply currents $I_{R1}, I_{R2}, \ldots I_{Rn}$ are the same, because the source 6 is the same, the power consumed is the same for all the elementary converters, irrespective of the tolerances on the electronic components.

In the preferred embodiments of the invention, error voltages $e_{i1}, e_{i2}, \ldots e_{in}$ corresponding to a regulated intensity $I_{reg}$ 19 derived from a comparison 20 between the reference intensity $I_{ref}$ and the supply currents $I_{R1}, I_{R2}, \ldots I_{Rn}$ are converted into switching frequencies $F_1, F_2, \ldots F_n$ by a voltage—frequency conversion 21, in order to control the elementary converters.

Since the error voltages $e_{i1}, e_{i2}, \ldots e_{in}$ are not identical if the circuits have dissymmetries, the elementary converters function at different switching frequencies $F_1, F_2, \ldots F_n$.

Figure 3:
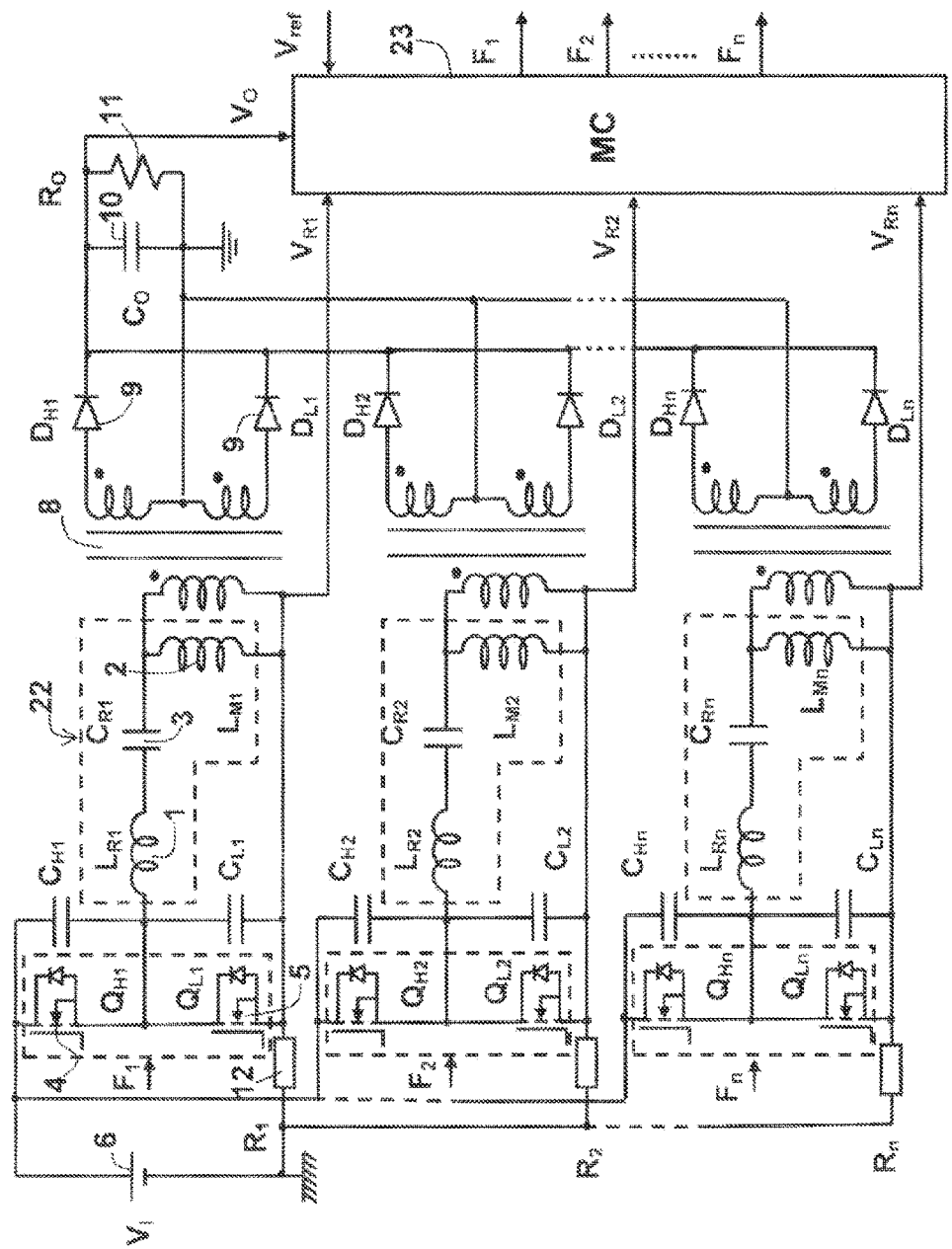
FIG. 3 represents schematically a preferred embodiment of a multiphase resonant DC/DC converter and its control device according to the invention.

In a multiphase converter according to the invention represented in FIG. 3, the control units 21 for the switching elements 4, 5 of the half-bridges of the elementary converters generate complementary square signals with a duty cycle close to 50%, with a constant dead time in order to avoid the phenomenon of overlapping, in a known manner.

However, unlike the prior art, no phase shift is introduced between the square signals which control the different elementary converters.

The control device for a multiphase converter previously described has numerous advantages, in particular:
- simplicity of construction and implementation;
- balancing of the supply currents $I_{R1}, I_{R2}, \ldots I_{Rn}$ of the elementary converters independently from the tolerances of the components;
- zero voltage switching mode within the limit of the functioning frequencies $F_1, F_2, \ldots F_n$;
- regular distribution of the power between the elementary converters, and consequently regular distribution of the losses and temperature increases;
- possibility of obtaining high power levels by putting a plurality of high-performance elementary converters in parallel;
- improvement of the robustness;
- possible functioning between only two sources of voltage.

All of these advantages show that a multiphase resonant DC/DC converter comprising a control device of this type is an excellent solution for high-power conversion systems.

FIG. 3 represents schematically a converter with n phases according to the invention.

The elementary resonant DC/DC converters comprise cells 22 of the LLC type, their inputs being connected in parallel on the same source 6, and their outputs also being connected in parallel with a filtering capacitor 10 and a common charge resistor 11.

The resistors $R_1, R_2, \ldots R_n$ of the shunts 12 which constitute the current sensors can vary between a few m$\Omega$ and a few hundred m$\Omega$ according to the supply currents $I_{R1}, I_{R2}, \ldots I_{Rn}$ and the level of the measurement voltages $V_{R1}, V_{R2}, \ldots V_{Rn}$ required.

The shunts 12 are inserted in series on the earthing side in the supply circuits of the elementary converters, such that the measurement voltages $V_{R1}, V_{R2}, \ldots V_{Rn}$ are not floating.

Each elementary converter comprises a half-bridge consisting of two switching elements of the MOSFET type 4, 5.

Alternatively, the MOSFETs 4, 5 are replaced by switching elements of the BJT type (acronym for Bipolar Junction Transistor), or IGBT type (acronym for Insulated Gate Bipolar Transistor).

A plurality of switching elements 4, 5 of the same type are advantageously grouped in parallel in order to decrease the losses by conduction and increase the intensities admissible.

Each LLC cell 22 comprises in series a first inductive resistor 1 (resonant inductive resistor) with a first induction coil $L_{R1}, L_{R2}, \ldots L_{Rn}$, a capacitor 3 (resonant capacitor) with a capacity $C_{R1}, C_{R2}, \ldots C_{Rn}$, and a second inductive resistor 2 (magnetising or primary inductive resistor) with a second induction coil $L_{M1}, L_{M2}, \ldots L_{Mn}$.

The resonant capacitor 3 is advantageously divided into two capacitive elements with a value two times smaller which are connected in series, and connected in parallel on the half-bridge 4, 5, the mid-point being connected to the transformer 8.

The first inductive resistor 1 is represented as a separate component; alternatively, it is completely integrated in the transformer 8 and it is considered that it has a leakage inductance.

The second inductive resistor 2 is also represented as another separate component; alternatively, it is also completely integrated in the transformer 8.

Since the switching frequencies can be different, the capacitors $C_{R1}, C_{R2}, \ldots C_{Rn}$, the first induction coils $L_{R1}, L_{R2}, \ldots L_{Rn}$, and the second induction coils $L_{M1}, L_{M2}, \ldots L_{Mn}$ of these electronic components of the multiphase resonant DC/DC converter do not need to be matched.

In elementary converter models with a low output voltage where the direct voltage drop of the diodes 9 is too great to be neglected, the diodes 9 are advantageously diodes of the Schottky type, in order to reduce the load losses.

For the same purpose, use will highly advantageously made of synchronous rectifiers. The synchronous rectifiers in question comprise semiconductor switches which are connected in parallel to the diodes 9, such that these switches are on when the diodes 9 are polarised directly.

As shown clearly in FIG. 3, all of the elementary converters of the multiphase converter according to the invention are controlled by a control module 23 which generates the switching frequencies $F_1, F_2, \ldots F_n$ of the control units 21 of the switching elements 4, 5 according to the measurement voltages $V_{R1}, V_{R2}, \ldots V_{Rn}$ and the output voltage $V_o$ according to the schematic diagram in FIG. 2.

Figure 4:
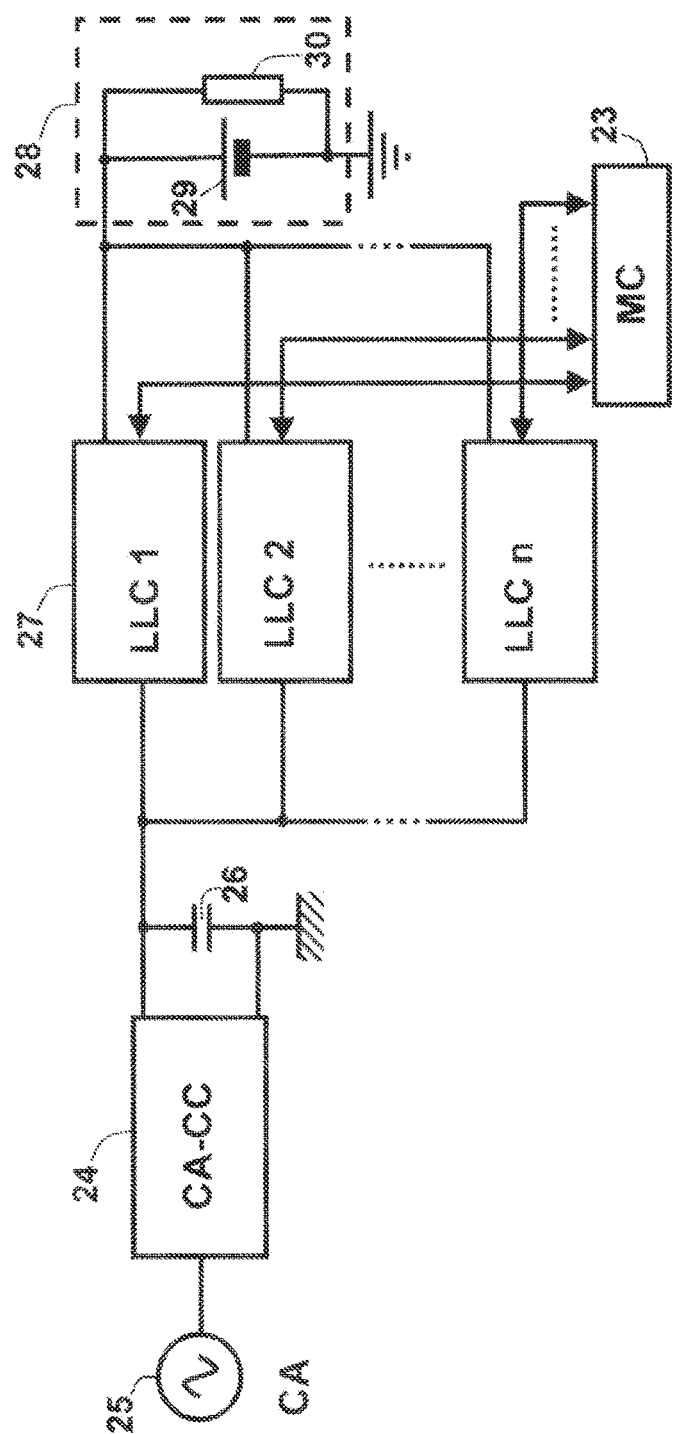
FIG. 4 represents schematically a multiphase resonant AC/DC converter and its control device according to the invention.

FIG. 4 shows another example of a multiphase converter in which advantage will be derived from implementation of the method and of the control device according to the invention.

This is a multiphase alternating current—direct current (AC/DC) converter comprising:

an AC/DC converter 24 at the input which can be connected to an alternative voltage source 25;

a filtering capacitor 26 at the output from the AC/DC converter;

a multiphase resonant DC/DC converter comprising a plurality of elementary resonance converters 27 which are connected at the input in parallel on the output of the AC/DC converter, and are connected in parallel at the output;

a control module 23 which functions according to the principles of the invention.

The charge 28 at the output is constituted by one or more pieces of equipment, for example a battery 29 and a resistive charge 30.

This architecture will be advantageously implemented in an electric vehicle in order to charge the high-voltage batteries of the vehicle (for example 300 V DC) from the mains 25 (in particular 220 V AC), and at the same time to charge the low-voltage battery 29 (for example 12 V) with good performance.

It will be appreciated that the invention is not limited simply to the preferred embodiments previously described.

The architecture of the elementary resonant DC/DC converters can be different from that specified. In particular the resonant circuits (7, 22) of the LLC series type can be replaced by circuits of the LC parallel or LC series type, or also by circuits of the LCC type.

The supply currents of the elementary converters $I_{R1}$, $I_{R2}$, ... $I_{Rn}$ can alternatively be measured by intensity measurement means 13 which are different from shunts 12, for example by Hall effect sensors or current transformers.

The invention thus incorporates all the possible variant embodiments, provided that these variants remain within the scope defined by the following claims.

The invention claimed is:

1. A method for controlling a multiphase resonant DC/DC converter comprising a plurality of identical elementary resonant DC/DC converters connected in parallel and provided with supply currents ($I_{R1}$, $I_{R2}$, ... $I_{Rn}$) the method comprising the steps of:

measuring each of the supply currents ($I_{R1}$, $I_{R2}$, ... $I_{Rn}$) of the elementary converters for balancing the supply currents ($I_{R1}$, $I_{R2}$, ... $I_{Rn}$);

controlling switching frequencies ($F_1$, $F_2$, ... $F_n$) of the elementary converters according to the supply currents ($I_{R1}$, $I_{R2}$, ... $I_{Rn}$), so as to carry out the balancing; and setting the supply currents ($I_{R1}$, $I_{R2}$, ... $I_{Rn}$) to a common reference intensity (Iref) which is determined according to a difference between an output voltage (Vo) of the multiphase converter and a nominal voltage (Vref).

2. The method according to claim 1, wherein the supply currents (IR1, IR2, ... IRn) are determined by measuring differences of potential (VR1, VR2, ... VRn) at terminals of shunts (12) inserted in series in supply circuits of the elementary converters.

3. The method according to claim 1, wherein the switching frequencies (F1, F2, Fn) are derived from a voltage-frequency conversion (21).

4. A device for controlling the multiphase resonant DC/DC converter, the device comprising an intensity measurement device for each of the supply currents ($I_{R1}$, $I_{R2}$, ... $I_{Rn}$) of the elementary converters for balancing the supply currents ($I_{R1}$, $I_{R2}$, ... $I_{Rn}$), and configured to implement the method according to claim 1, wherein the device further comprises frequency generators (21) which generate switching frequencies ($F_1$, $F_2$, ... $F_n$) for the elementary converters according to the supply currents ($I_{R1}$, $I_{R2}$, ... $I_{Rn}$).

5. A device for controlling a multiphase resonant DC/DC converter comprising a plurality of identical elementary resonant DC/DC converters connected in parallel and provided with supply currents ($I_{R1}$, $I_{R2}$, ... $I_{Rn}$), the device comprising:

an intensity measurement device for each of the supply currents ($\mathbf{1}_{R1}$, $I_{R2}$, ... $I_{Rn}$) of the elementary converters for balancing the supply currents ($I_{R1}$, $I_{R2}$, ... $I_{Rn}$), and configured to implement a method for controlling the multiphase resonant DC/DC converter;

a comparator between an output voltage (Vo) of the multiphase converter and a nominal voltage (Vref); and a regulation loop which sets the supply currents ($I_{R1}$, $I_{R2}$, ... $I_{Rn}$) to a common reference intensity (Iref);

the method for controlling comprising the steps of:

measuring each of the supply currents ($I_{R1}$, $I_{R2}$, ... $I_{Rn}$) of the elementary converters for balancing the supply currents ($I_{R1}$, $I_{R2}$, ... $I_{Rn}$); and controlling switching frequencies ($F_1$, $F_2$, ... $F_n$) of the elementary converters according to the supply currents ($I_{R1}$, $I_{R2}$, ... $I_{Rn}$) so as to carry out the balancing;

the device further comprising frequency generators (21) which generate the switching frequencies ($F_1$, $F_2$, ... $F_n$ for the elementary converters according to the supply currents ($I_{R1}$, $I_{R2}$, ... $I_{Rn}$).

6. A device for controlling the multiphase resonant DC/DC converter according to claim 5, wherein the intensity measurement means (13) comprise:

shunts (12) inserted in series in supply circuits of the elementary converters;

a voltage measurement device which determines differences of potential (VR1, VR2, ... VRn) at the terminals of the shunts (12).

7. A multiphase resonant DC/DC converter, comprising a control device for controlling a multiphase resonant DC/DC converter comprising a plurality of identical elementary resonant DC/DC converters connected in parallel and provided with supply currents ($I_{R1}$, $I_{R2}$, ... $I_{Rn}$), the control device comprising:

an intensity measurement device for each of the supply currents ($\mathbf{1}_{R1}$, $\mathbf{1}_{R2}$, $\mathbf{1}_{Rn}$) of the elementary converters for balancing the supply currents ($I_{R1}$, $I_{R2}$, ... $\mathbf{1}_{Rn}$ and configured to implement a method for controlling the multiphase resonant DC/DC converter;

a comparator between an output voltage (Vo) of the multiphase converter and a nominal voltage (Vref); and a regulation loop which sets the supply currents $I_1$, $I_{R2}$, ... $\mathbf{1}_{Rn}$) to a common reference intensity (Iref);

the method for controlling comprising the steps of:

measuring each of the supply currents ($I_1$, $I_{R2}$, ... $I_{Rn}$) of the elementary converters for balancing the supply currents ($I_{R1}$, $I_{R2}$, ... $I_{Rn}$); and controlling switching frequencies ($F_1 F_2$, ... $F_n$) of the elementary converters according to the supply currents ($I_{R1}$, $I_{R2}$, ... $I_{Rn}$)so as to carry out the balancing;

the device further comprising frequency generators (21) which generate the switching frequencies ($F_1$, $F_2$, ... for the elementary converters according to the supply currents ($I_{R1}$, $I_{R2}$, ... $I_{Rn}$.

* * * * *